US011350131B2

(12) United States Patent
Hsiang et al.

(10) Patent No.: US 11,350,131 B2
(45) Date of Patent: May 31, 2022

(54) SIGNALING CODING OF TRANSFORM-SKIPPED BLOCKS

(71) Applicant: MediaTek Inc., Hsinchu (TW)

(72) Inventors: Shih-Ta Hsiang, Hsinchu (TW); Lulin Chen, San Jose, CA (US); Tzu-Der Chuang, Hsinchu (TW); Chih-Wei Hsu, Hsinchu (TW); Ching-Yeh Chen, Hsinchu (TW); Olena Chubach, San Jose, CA (US); Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 16/908,436

(22) Filed: Jun. 22, 2020

(65) Prior Publication Data

US 2020/0413100 A1 Dec. 31, 2020

Related U.S. Application Data

(60) Provisional application No. 62/868,830, filed on Jun. 28, 2019.

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/124* (2014.11); *H04N 19/176* (2014.11)

(58) Field of Classification Search
None
See application file for complete search history.

(56) References Cited

U.S. PATENT DOCUMENTS 6,137,922 A 10/2000 Broussard et al.
2014/0146894 A1 5/2014 Yu et al.
(Continued)

FOREIGN PATENT DOCUMENTS

CN 104380734 A 2/2015
CN 104380740 A 2/2015
(Continued)

OTHER PUBLICATIONS

China Natinoal Intellectual Property Administration, International Search Report and Written Opinion for PCT/CN2020/098271, dated Sep. 7, 2020.
(Continued)

*Primary Examiner* — Christopher Braniff
(74) *Attorney, Agent, or Firm* — Oblon, McClelland, Maier & Neustadt, L.L.P.

(57) ABSTRACT

A method for performing transform skip mode (TSM) in a video decoder is provided. A video decoder receives data from a bitstream to be decoded as a plurality of video pictures. The video decoder parses the bitstream for a first syntax element in a sequence parameter set (SPS) of a current sequence of video pictures. When the first syntax element indicates that transform skip mode is allowed for the current sequence of video pictures and when transform skip mode is used for a current block in a current picture of the current sequence, the video decoder reconstructs the current block by using quantized residual signals that are not transformed.

14 Claims, 8 Drawing Sheets

(51) Int. Cl.
*H04N 19/124* (2014.01)
*H04N 19/176* (2014.01)

(56) References Cited

U.S. PATENT DOCUMENTS

| | | | | |
|---|---|---|---|---|
| 2017/0230687 | A1 | 8/2017 | Chen et al. | |
| 2020/0382805 | A1 * | 12/2020 | Zhao | H04N 19/119 |

FOREIGN PATENT DOCUMENTS

| | | | |
|---|---|---|---|
| CN | 104509113 | A | 4/2015 |
| CN | 105165012 | A | 12/2015 |
| WO | WO202018502 | * | 9/2020 |

OTHER PUBLICATIONS

Taiwan Intellectual Property Office, Office Action for Taiwan Patent Application No. 109121316, dated Jun. 23, 2021.
Office Action dated Oct. 28, 2021 in Taiwanese Patent Application No. 11021051210.

* cited by examiner

SIGNALING CODING OF TRANSFORM-SKIPPED BLOCKS

CROSS REFERENCE TO RELATED PATENT APPLICATION(S)

The present disclosure is part of a non-provisional application that claims the priority benefit of U.S. Provisional Patent Application No. 62/868,830, filed on 28 Jun. 2019. Content of above-listed application is herein incorporated by reference.

TECHNICAL FIELD

The present disclosure relates generally to video processing. In particular, the present disclosure relates to methods of signaling coding of a block of video data.

BACKGROUND

Unless otherwise indicated herein, approaches described in this section are not prior art to the claims listed below and are not admitted as prior art by inclusion in this section.

In a video coding system implementing High-Efficiency Video Coding (HEVC), the input video signal is predicted from the reconstructed signal, which is derived from the coded picture regions. The prediction residual signal is processed by a linear transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for output and for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit includes a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma. In some other coding standards, each CTU can be partitioned into one or multiple smaller size coding units (CUs) by a quadtree with nested multi-type tree using binary and ternary split. The resulting CU partitions can be in square or rectangular shapes.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a method for performing transform skip mode (TSM) in a video decoder. A video decoder receives data from a bitstream to be decoded as a plurality of video pictures. The video decoder parses the bitstream for a first syntax element in a sequence parameter set (SPS) of a current sequence of video pictures. When the first syntax element indicates that transform skip mode is allowed for the current sequence of video pictures and when transform skip mode is used for a current block in a current picture of the current sequence, the video decoder reconstructs the current block by using quantized residual signals that are not transformed.

When the first syntax element indicates that transform skip mode is allowed for the current sequence of video pictures, the video decoder parses the bitstream for a second syntax element in the SPS for indicating whether Block Delta Pulse Code Modulation (BDPCM) is allowed for the current sequence of video pictures. In some embodiments, when the first syntax element indicates that transform skip mode is allowed for the current sequence of video pictures, the video decoder further parses the bitstream for a third syntax element for indicating whether the residual signals of the current block is entropy coded by using an alternative residual coding process.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
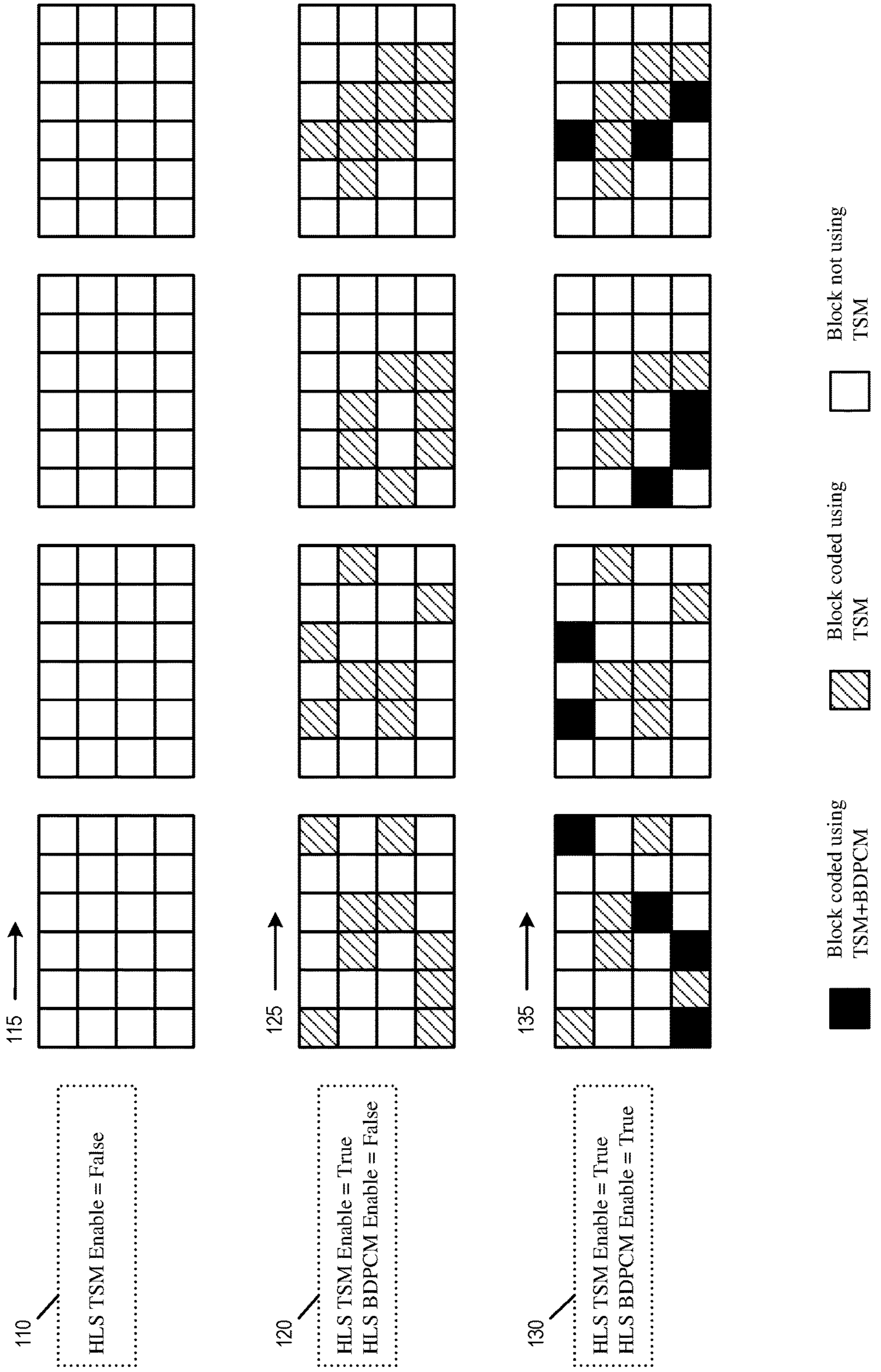
FIG. 1 conceptually illustrates the signaling of TSM related signals in a high-level syntax set.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Entropy Coding of Pixel Blocks

Some embodiments of the disclosure provide methods for controlling the usages of coding tools in a video coding system. Some video coding systems such as Versatile Video Coding (VVC) are developed for supporting diverse video applications. Some of the coding tools for new coding applications such screen content coding may not be useful for coding traditional camera-captured video contents. In accordance with some aspects of the present invention, a video coder may signal one or more high-level syntax elements to control the usage of some of the coding tools for targeting applications.

In some embodiments, a coded block flag (CBF) is utilized to signal if there is any non-zero transform coefficient in a transform block. When the CBF is equal to 0, the associated transform block is not further coded and all the coefficients in the current transform block are inferred to be equal to 0. Otherwise, the associated transform block contains at least one nonzero transform coefficient. A nonzero transform block is further divided into non-overlapped subblocks. A syntax element coded_sub_block_flag may be signaled to indicate whether a current subblock contains any nonzero coefficients. When coded_sub_block_flag is equal to 0, the associated transform subblock is not further coded and all the coefficients in the current transform subblock are inferred to be equal to 0. Otherwise, the associated transform block contains at least one non-zero transform coefficient. The values of the transform coefficient levels in the associated subblock are entropy coded using multiple subblock coding passes. In each coding pass, the individual transform coefficients are visited once according to a pre-defined scanning order.

In some embodiments, a syntax element sig_coeff_flag is signaled in the first subblock coding pass to indicate whether the absolute value of a current transform coefficient level is greater than 0. A syntax element coeff_abs_level_greater1_flag is further signaled in the 2nd coding pass for a current coefficient with sig_coeff_flag equal to 1 to indicate whether the absolute value of the associated transform coefficient level is greater than 1. A syntax element coeff_abs_level_greater2_flag is further signaled in the 3rd coding pass for a current coefficient with coeff_abs_level_greater1_flag equal to 1 to indicate whether the absolute value of the associated transform coefficient level is greater than 2. The sign information and the remaining level values are further signaled by syntax elements coeff_sign_flag and coeff_abs_level_remaining in the 4th coding and 5th subblock coding passes, respectively.

In some embodiments, the transform coefficients may be quantized by dependent scalar quantization. The selection of one of the two quantizers is determined by a state machine with four states. The state for a current transform coefficient is determined by the state and the parity of the absolute level value for the preceding transform coefficient in scanning order. The transform blocks are partitioned into non-overlapped sub-blocks. The transform coefficient levels in each sub-block are entropy coded using multiple sub-block coding passes. The syntax elements sig_coeff_flag, abs_level_gt1_flag, par_level_flag and abs_level_gt3_flag are signaled in the first sub-block coding pass. The elements abs_level_gt1_flag and abs_level_gt3_flag indicate whether the absolute value of the current coefficient level is greater than 1 and greater than 3, respectively. The syntax element par_level_flag indicates the party bit of the absolute value of the current level. The partially reconstructed absolute value of a transform coefficient level from the $1^{st}$ pass is given by AbsLevelPass1=sig_coeff_flag+par_level_flag+abs_level_gt1_flag+2*abs_level_gt3_flag Context selection for entropy coding sig_coeff_flag is dependent on the state for the current coefficient. par_level_flag is thus signaled in the 1st coding pass for deriving the state for the next coefficient. The syntax elements abs_remainder and coeff_sign_flag are further signaled in the following sub-block coding passes to indicate the remaining coefficient level values and signs, respectively. The fully reconstructed absolute value of a transform coefficient level is given by AbsLevel=AbsLevelPass1+2*abs_remainder The transform coefficient level is given by TransCoeffLevel=(2*AbsLevel−(QState>1?1:0))*(1−2*coeff_sign_flag), where QState indicates the state for the current transform coefficient.

For achieving high compression efficiency, the context-based adaptive binary arithmetic coding (CABAC) mode, or known as regular mode, is employed for entropy coding the values of the syntax elements in HEVC and VVC Draft. As the arithmetic coder in the CABAC engine can only encode the binary symbol values, the CABAC operation first needs to convert the value of a syntax element into a binary string, the process commonly referred to as binarization. During the coding process, the probability models are gradually built up from the coded symbols for the different contexts. The selection of the modeling context for coding the next binary symbol can be determined by the coded information. Symbols can be coded without the context modeling stage and assume an equal probability distribution, commonly referred to as the bypass mode, for improving bitstream parsing throughput rate.

In some embodiments, the values of the syntax elements coded_sub_block_flag, sig_coeff_flag, coeff_abs_level_greater1_flag, and coeff_abs_level_greater2_flag in a transform subblock are coded in the regular mode. The values of the syntax elements coeff_sign_flag and coeff_abs_level_remaining in a transform subblock are coded in the bypass mode. In order to limit the total number of the regular bins for entropy coding tranform coefficient levels in a sub-block under the worst-case scenario, each subblock only allows to code up to eight coeff_abs_level_greater1_flag values and one coeff_abs_level_greater2_flag value. In this way, the maximum number of the regular bins in each subblock can be limited to 25.

In some embodiments, the syntax elements sig_coeff_flag, coeff_sign_flag, abs_level_gt1_flag, and par_level_flag are signaled in the 1st sub-block pass. The syntax elements abs_level_gt3_flag, abs_level_gt5_flag, abs_level_gt7_flag, and abs_level_gt9_flag are entropy coded in the sub-block coding passes 2, 3, 4, and 5, respectively. The context modeling for sig_coeff_flag is conditioned on the sig_coeff_flag values of the two neighbors. The context modeling for abs_level_gt1_flag and par_level_flag employs single contexts, respectively. In some embodiments, the syntax elements abs_level_gtx_flag[n][j], j=0 . . . 4,] specifies whether the absolute value of the transform coefficient level (at scanning position n) is greater than (j<<1)+1 and corresponds to syntax elements abs_level_gt1_flag, abs_level_gt3_flag, abs_level_gt3_flag, abs_level_gt5_flag, abs_level_gt7_flag, and abs_level_gt9_flag, respectively. The syntax elements par_level_flag and abs_level_gtx_flag [n][j], j=0 . . . 4,] is each coded using a single context variable.

II. Transform-Skipped Blocks

In some embodiments, methods for signaling transform skip (TS) mode, Block-based Delta Pulse Code Modulation (BDPCM) mode, and other transform skip related tools are provided. When a block is coded by using transform skip mode, the quantized residual signal is entropy coded without going through transform operations. When a block is coded by using BDPCM mode, the residual is quantized and the difference between each quantized residual and its predictor, e.g., a previously coded residual of horizontal or vertical (depending on a BDPCM prediction direction) neighboring position, is coded.

In some embodiments, a video coder may signal multiple syntax elements in high-level syntax (HLS) sets such as the sequence parameter set (SPS), the picture parameter set (PPS), and/or the slice header for controlling the use of the transform skip mode and related coding tools. In some embodiments, high-level syntax (HLS) sets represent the syntax sets for the level higher than the block level, such as the sequence parameter set (SPS), the picture parameter set (PPS), the slice header or any other set for the level higher than the block level. The video coder may signal one or more high-level syntax elements to indicate whether the transform skip mode (TSM) is enabled or not in the current bitstream. When the transform skip mode is enabled, the video coder may further signal one or more high-level syntax elements to indicate whether BDPCM is enabled or not in the current bitstream.

In some embodiments, when the transform skip mode is enabled, the video coder may further signal one or more high-level syntax elements to indicate whether to employ an alternative residual coding tool or process for coding a residual block in TSM. Specifically, when a CU is coded in transform skip mode (in other words, transform skip mode is used for the CU), its prediction residual may be quantized and (entropy) coded using a transform skip residual coding process, also referred to as an alternative residual coding process. In some embodiments, alternative residual coding process is modified from the conventional transform coefficient coding process. Specifically, the residuals of a TU are coded in units of non-overlapped subblocks of size 4×4, forward-scanning order is applied to scan the subblocks within a transform block and also the positions within a subblock; no signaling of the last (x, y) position; coded_sub_block_flag is coded for every subblock except for the last subblock when all previous flags are equal to 0; sig_coeff_flag context modelling uses a reduced template, and context model of sig_coeff_flag depends on top and left neighboring values; context model of abs_level_gt1 flag also depends on the left and top sig_coeff_flag context modelling uses a reduced template, and context model of sig_coeff_flag depends on top and left neighboring values; par_level_flag using only one context model; additional greater than 3, 5, 7, 9 flags are signaled to indicate the coefficient level, one context for each flag; modified parameter derivation for the binarization of the remainder values is used; and context model of the sign flag is determined based on left and above neighboring values and the sign flag is parsed after sig_coeff_flag to keep all context coded bins together.

In some embodiments, a video coder may signal the SPS syntax element sps_transform_skip_enabled_flag and the PPS syntax elements pps_bdpcm_enabled_flag and pps_alternative_residual_coding_flag for signaling whether to enable TSM, BDPCM, and alternative residual coding tools. Related syntax tables for SPS, PPS, transform unit, are provided below:

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_transform_skip_enabled_flag | u(1) |
| sps_seq_parameter_set_id | ue(v) |
| ... | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

| pic_parameter_set_rbsp( ) { | Descriptor |
|---|---|
| pps_pic_parameter_set_id | ue(v) |
| pps_seq_parameter_set_id | ue(v) |
| output_flag_present_flag | u(1) |
| ... | |
| if (sps_transform_skip_enabled_flag) { | |
| transform_skip_enabled_flag | u(1) |
| if( transform_skip_enabled_flag) { | |
| pps_bdpcm_enabled_flag | u(1) |
| pps_alternative_residual_coding_flag | u(1) |
| } | |
| } | |
| if(transform_skip_enabled_flag ) | |
| 1og2_transform_skip_max_size_minus2 | ue(v) |
| ... | |
| pps_extension_flag | u(1) |
| if( pps_extension_flag ) | |
| while( more_rbsp_data( ) ) | |
| pps_extension_data_flag | u(1) |
| rbsp_trailing_bits( ) | |
| } | |

| transform_unit( x0, y0, tbWidth, tbHeight, treeType, subTuIndex ) { | Descriptor |
|---|---|
| if( ( treeType = = SINGLE_TREE \| \| treeType = = DUAL_TREE_CHROMA ) && | |
| ChromaArrayType != 0 ) { | |
| if( ( IntraSubPartitionsSplitType = = ISP_NO_SPLIT && !(cu_sbt_flag && | |
| ( ( subTuIndex = = 0 && cu_sbt_pos_flag ) \| \| | |
| ( subTuIndex = = 1 && !cu_sbt_pos_flag ) ) ) ) \| \| | |
| ( IntraSubPartitionsSplitType != ISP_NO_SPLIT && | |
| ( subTuIndex = = NumIntraSubPartitions - 1) ) ) { | |
| tu_cbf_cb[ x0 ] [ y0 ] | ae(v) |
| tu_cbf_cr[ x0 ] [ y0 ] | ae(v) |
| } | |
| } | |
| ... | |
| if( tu_cbf_luma[ x0 ] [ y0 ] ) { | |
| if( !transform_skip_flag[ x0 ] [ y0 ]) | |
| residual_coding( x0, y0, Log2( tbWidth ), Log2( tbHeight ), 0 ) | |
| else if ( pps_alternative_residual_coding_flag ) | |
| residual_ts_coding( x0, y0, Log2( tbWidth ), Log2( tbHeight ), 0 ) | |
| else | |
| residual_coding( x0, y0, Log2( tbWidth ), Log2( tbHeight ), 0 ) | |
| } | |
| if( tu_cbf_cb[ x0 ] [ y0 ] ) | |
| residual_coding( xC, yC, Log2( wC ), Log2( hC ), 1 ) | |
| if( tu_cbf_cr[ x0 ] [ y0 ] ) { | |
| if( tu_cbf_cb[ x0 ] [ y0 ] ) | |
| tu_joint_cbcr_residual[ x0 ] [ y0 ] | ae(v) |
| if( !tu_joint_cbcr_residual[ x0 ] [ y0 ] ) | |
| residual_coding( xC, yC, Log2( wC ), Log2( hC ), 2 ) | |
| } | |
| } | |

In some embodiment, a video coder may signal the SPS syntax elements sps_transform_skip_enabled_flag, sps_bdpcm_enabled_flag and sps_alternative_residual_coding_flag for signaling whether to enable TSM, BDPCM, and alternative residual coding tools. Related syntax tables for SPS, PPS, and transform unit, are provided as follow:

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level(sps_max_sub_layers_minus1 ) | |
| gra_enabled_flag | u(1) |
| sps_transform_skip_enabled_flag | u(1) |
| if( sps_transform_skip_enabled_flag) { | |
| sps_bdpcm_enabled_flag | u(1) |
| sps_alternative_residual_coding_flag | u(1) |
| } | |
| sps_seq_parameter_set_id | ue(v) |
| ... | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

| pic_parameter_set_rbsp( ) { | Descriptor |
|---|---|
| pps_pic_parameter_set_id | ue(v) |
| pps_seq_parameter_set_id | ue(v) |
| output_flag_present_flag | u(1) |
| ... | |
| if(sps_transform_skip_enabled_flag ) | |
| log2_transform_skip_max_size_minus2 | ue(v) |
| ... | |
| pps_extension_flag | u(1) |
| if( pps_extension_flag ) | |
| while( more_rbsp_data( ) ) | |
| pps_extension_data_flag | u(1) |
| rbsp_trailing_bits( ) | |
| } | |

| transform_unit( x0, y0, tbWidth, tbHeight, treeType, subTuIndex ) { | Descriptor |
|---|---|
| if( ( treeType = = SINGLE_TREE \| \| treeType = = DUAL_TREE_CHROMA ) && | |
| ChromaArrayType != 0 ) { | |
| if( ( IntraSubPartitionsSplitType = = ISP_NO_SPLIT && !(cu_sbt_flag && | |
| ( ( subTuIndex = = 0 && cu_sbt_pos_flag ) \| \| | |
| ( subTuIndex = = 1 && !cu_sbt_pos_flag ) ) ) ) \| \| | |
| ( IntraSubPartitionsSplitType != ISP_NO_SPLIT && | |
| ( subTuIndex = = NumIntraSubPartitions - 1) ) ) { | |
| tu_cbf_cb[ x0 ] [ y0 ] | ae(v) |
| tu_cbf_cr[ x0 ] [ y0 ] | ae(v) |
| } | |

-continued

```
transform_unit( x0, y0, tbWidth, tbHeight, treeType, subTuIndex ) {          Descriptor
            }
...
   if( tu_cbf_luma[ x0 ] [ y0 ]              && treeType                    !=
DUAL_TREE_CHROMA
      && ( tbWidth <= 32 ) && ( tbHeight <= 32 )
      && ( IntraSubPartitionsSplit[ x0 ] [ y0 ] = = ISP_NO_SPLIT )
&& ( !cu_sbt_flag ) ) {
      if( sps_transform_skip_enabled_flag && tbWidth <= MaxTsSize
&& tbHeight <= MaxTsSize )
      transform_skip_flag[ x0 ] [ y0 ]                                      ae(v)
   if(      (( CuPredMode[ x0 ] [ y0 ]     !=     MODE_INTRA          &&
sps_explicit_mts_inter_enabled_flag )
   | |   ( CuPredMode[ x0 ] [y0 ]          = =    MODE_INTRA          &&
sps_explicit_mts_intra_enabled_flag ))
      && ( !transform_skip_flag[ x 0 ] [ y0 ] ) )
      tu_mts_idx[ x0 ] [ y0 ]                                               ae(v)
            }
            if( tu_cbf_luma[ x0 ] [ y0 ] ) {
               if( !transform_skip_flag[ x0 ] [y0 ])
                  residual_coding( x0, y0, Log2( tbWidth ), Log2( tbHeight ), 0 )
               else if ( sps_alternative_residual_coding_flag )
                  residual_ts_coding( x0, y0, Log2( tbWidth ), Log2( tbHeight ), 0 )
               else
                  residual_coding( x0, y0, Log2( tbWidth ), Log2( tbHeight ), 0 )
            }
            if( tu_cbf_cb[ x0 ] [ y0 ] )
               residual_coding( xC, yC, Log2( wC ), Log2( hC ), 1 )
            if( tu_cbf_cr[ x0 ] [ y0 ] ) {
               if( tu_cbf_cb [ x0 ] [ y0 ] )
               tu_joint_cbcr_residual[ x0 ] [ y0 ]                          ae(v)
            if( !tu_joint_cbcr_residual[ x0 ] [ y0 ] )
               residual_coding( xC, yC, Log2( wC ), Log2( hC ), 2 )
            }
}
```

FIG. 1 conceptually illustrates the signaling of TSM related signals in a high-level syntax set such as SPS. The figure illustrates three SPSs 110, 120, and 130. The SPS 110 is applicable to a sequence of video pictures 115. The SPS 120 is applicable to a sequence of video pictures 125. The SPS 130 is applicable to a sequence of video pictures 135.

The SPS 110 includes a TSM enable syntax element that is set to false. Consequently, TSM is disallowed for the video sequence 115, and all blocks in the sequence 115 are coded without TSM. In some embodiments, this means each block of the video sequence 125 are coded by transforming spatial domain signals (e.g., prediction residuals) into transform domain signals (e.g., transform coefficients), which are in turn quantized and entropy coded. Furthermore, since the TSM enable syntax element in the SPS is set to false, there is no further TSM related syntax elements, such as BDPCM or alternative residual coding.

The SPS 120 includes TSM enable syntax element that is set to true. Consequently, TSM is allowed for the video sequence 125, and some of the blocks in some of the pictures in the sequence 125 are coded by using TSM. For the TSM-coded blocks, spatial domain residual signals are directly quantized and entropy coded without being transformed. Since the TSM enable syntax element is set to true, the SPS may include other TSM related syntax element such as a BDPCM enable syntax element. In this case, the BDPCM enable syntax element is set to false, and none of the blocks in the sequence 125 is coded by using BDPCM. Though not illustrated, there may be a syntax element (e.g., alternative_residual_coding_flag) that enables or disables alternative residual coding for some of the blocks in the sequence 125.

The SPS 130 includes a TSM enable syntax element that is set to true and a BDPCM enable flag that is set to true. Consequently, some of the blocks in the sequence 135 are coded by using TSM and BDPCM. For those blocks, the time-domain residual signals are coded by using BDPCM before being quantized and entropy coded without being transformed. Though not illustrated, there may be a syntax element (e.g., alternative_residual_coding_flag) that enables or disables alternative residual coding for some of the blocks in the sequence 135.

Any of the foregoing proposed methods can be implemented in encoders and/or decoders. For example, any of the proposed methods can be implemented in an entropy coding module of an encoder, and/or an entropy coding module of a decoder. Alternatively, any of the proposed methods can be implemented as a circuit integrated to the entropy coding module of the encoder and/or the entropy coding module of the decoder.

III. Example Video Encoder

Figure 2:
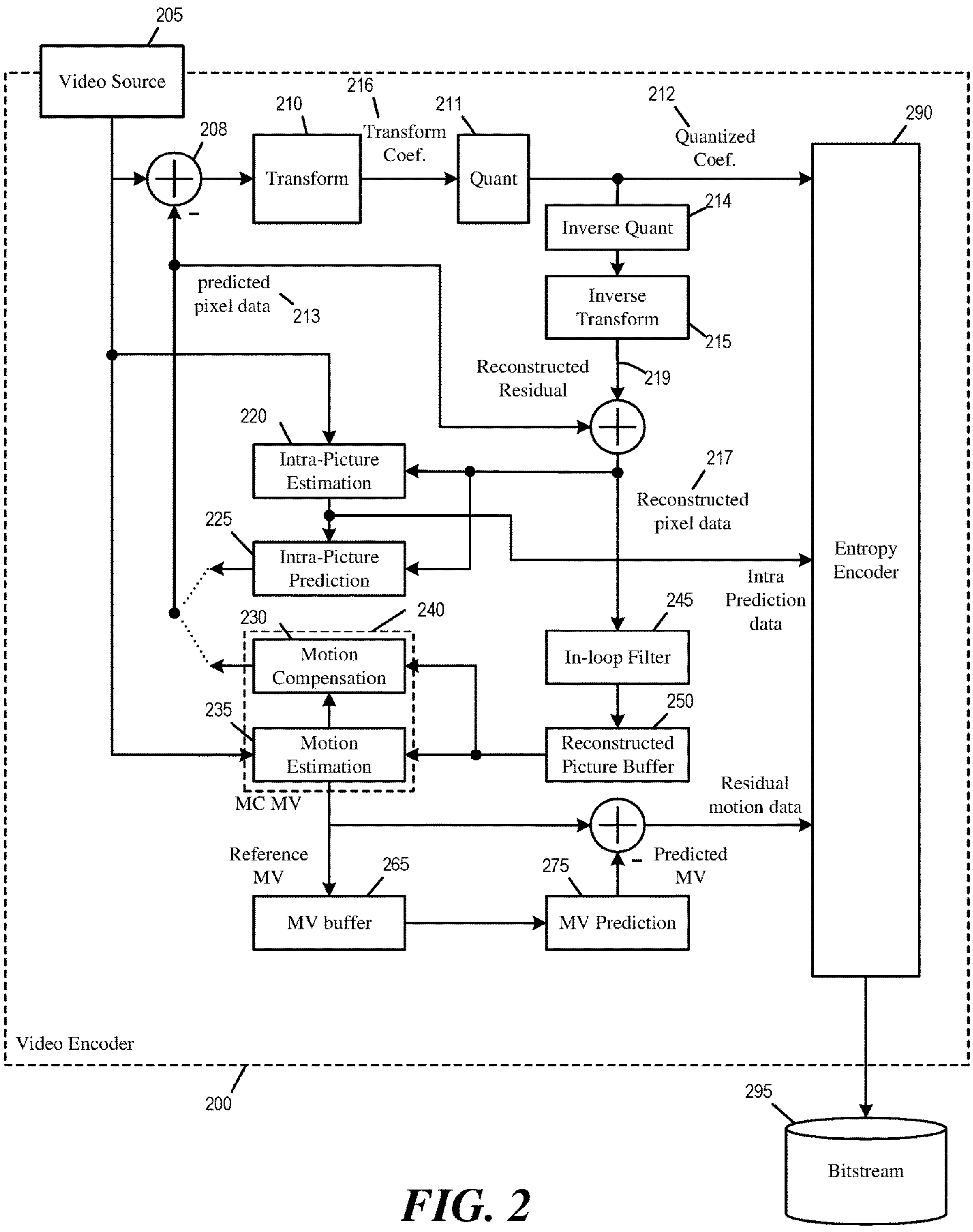
FIG. 2 illustrates an example video encoder that is capable of implementing transform skip mode.

FIG. 2 illustrates an example video encoder 200 that is capable of implementing transform skip mode. As illustrated, the video encoder 200 receives input video signal from a video source 205 and encodes the signal into bitstream 295. The video encoder 200 has several components or modules for encoding the signal from the video source 205, at least including some components selected from a transform module 210, a quantization module 211, an inverse quantization module 214, an inverse transform module 215, an intra-picture estimation module 220, an intra-prediction module 225, a motion compensation module 230, a motion estimation module 235, an in-loop filter 245, a reconstructed picture buffer 250, a MV buffer 265, and a MV prediction module 275, and an entropy encoder 290. The motion compensation module 230 and the motion estimation module 235 are part of an inter-prediction module 240.

In some embodiments, the modules 210-290 are modules of software instructions being executed by one or more processing units (e.g., a processor) of a computing device or electronic apparatus. In some embodiments, the modules 210-290 are modules of hardware circuits implemented by one or more integrated circuits (ICs) of an electronic apparatus. Though the modules 210-290 are illustrated as being separate modules, some of the modules can be combined into a single module.

The video source 205 provides a raw video signal that presents pixel data of each video frame without compression. A subtractor 208 computes the difference between the raw video pixel data of the video source 205 and the predicted pixel data 213 from the motion compensation module 230 or intra-prediction module 225. The transform module 210 converts the difference (or the residual pixel data or residual signal 209) into transform coefficients (e.g., by performing Discrete Cosine Transform, or DCT). The quantization module 211 quantizes the transform coefficients into quantized data (or quantized coefficients) 212, which is encoded into the bitstream 295 by the entropy encoder 290.

The inverse quantization module 214 de-quantizes the quantized data (or quantized coefficients) 212 to obtain transform coefficients, and the inverse transform module 215 performs inverse transform on the transform coefficients to produce reconstructed residual 219. The reconstructed residual 219 is added with the predicted pixel data 213 to produce reconstructed pixel data 217. In some embodiments, the reconstructed pixel data 217 is temporarily stored in a line buffer (not illustrated) for intra-picture prediction and spatial MV prediction. The reconstructed pixels are filtered by the in-loop filter 245 and stored in the reconstructed picture buffer 250. In some embodiments, the reconstructed picture buffer 250 is a storage external to the video encoder 200. In some embodiments, the reconstructed picture buffer 250 is a storage internal to the video encoder 200.

The intra-picture estimation module 220 performs intra-prediction based on the reconstructed pixel data 217 to produce intra prediction data. The intra-prediction data is provided to the entropy encoder 290 to be encoded into bitstream 295. The intra-prediction data is also used by the intra-prediction module 225 to produce the predicted pixel data 213.

The motion estimation module 235 performs inter-prediction by producing MVs to reference pixel data of previously decoded frames stored in the reconstructed picture buffer 250. These MVs are provided to the motion compensation module 230 to produce predicted pixel data.

Instead of encoding the complete actual MVs in the bitstream, the video encoder 200 uses MV prediction to generate predicted MVs, and the difference between the MVs used for motion compensation and the predicted MVs is encoded as residual motion data and stored in the bitstream 295.

The MV prediction module 275 generates the predicted MVs based on reference MVs that were generated for encoding previously video frames, i.e., the motion compensation MVs that were used to perform motion compensation. The MV prediction module 275 retrieves reference MVs from previous video frames from the MV buffer 265. The video encoder 200 stores the MVs generated for the current video frame in the MV buffer 265 as reference MVs for generating predicted MVs.

The MV prediction module 275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 295 by the entropy encoder 290.

The entropy encoder 290 encodes various parameters and data into the bitstream 295 by using entropy-coding techniques such as context-adaptive binary arithmetic coding (CABAC) or Huffman encoding. The entropy encoder 290 encodes various header elements, flags, along with the quantized transform coefficients 212, and the residual motion data as syntax elements into the bitstream 295. The bitstream 295 is in turn stored in a storage device or transmitted to a decoder over a communications medium such as a network.

The in-loop filter 245 performs filtering or smoothing operations on the reconstructed pixel data 217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 3:
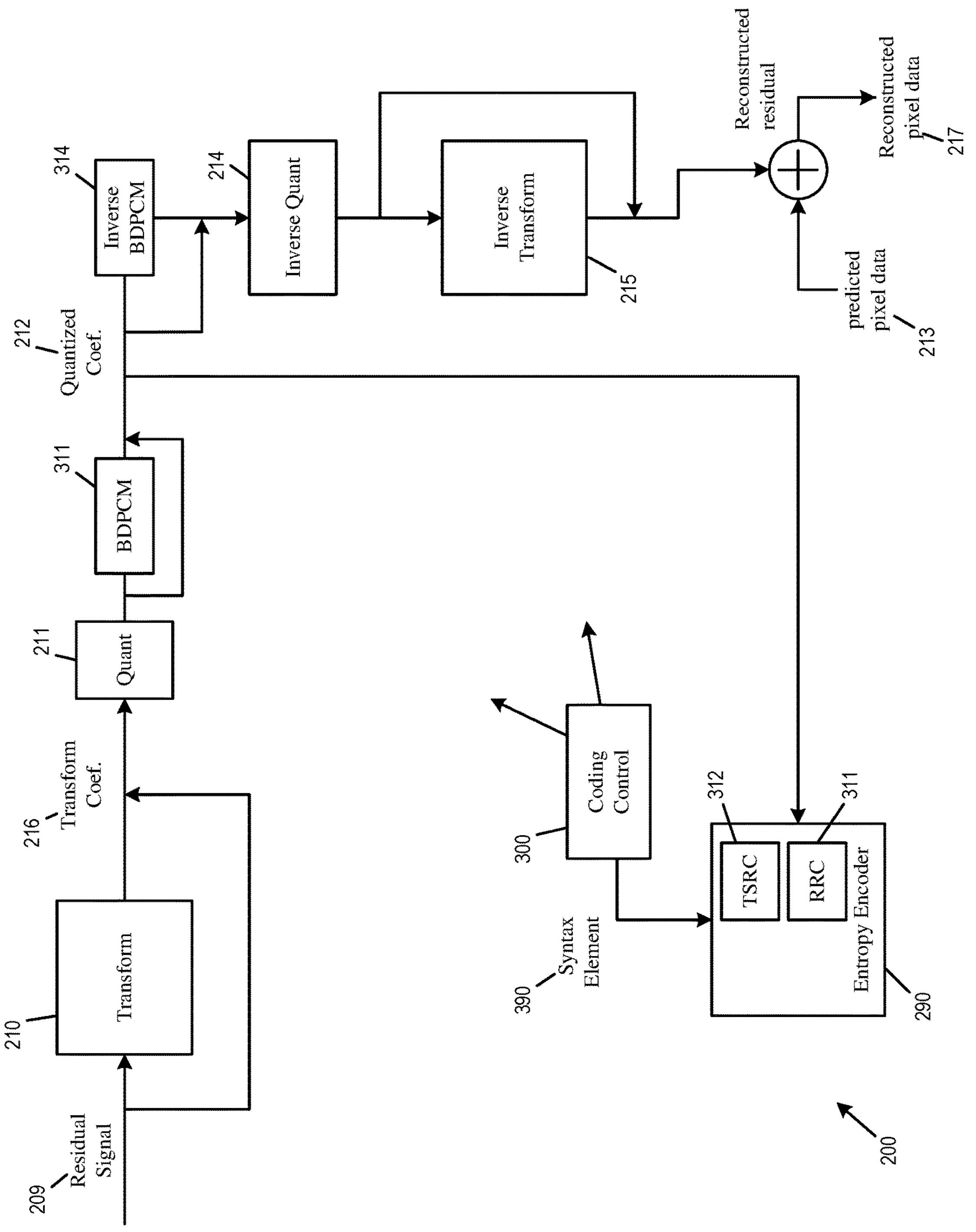
FIG. 3 illustrates portions of the video encoder that implement transform skip mode.

FIG. 3 illustrates portions of the video encoder 200 that implement transform skip mode. Specifically, the encoder 200 determines whether to skip transform operations, and whether to use transform skip related operations such as BDPCM and/or alternative residual coding for each block of pixels based on whether those tools are enabled for the current picture or a current sequence that includes the current picture.

As illustrated, the transform module 210 performs transform operations on the residual signal 209, and the inverse transform module 215 performs corresponding inverse transform operations. The encoder 200 may skip transform and inverse transform operations if TSM is activated for the current block being coded. When transform skip mode is used, the residual signal 209 is not processed by the transform module 210 but instead directly quantized by the quantization module 211. Also, when TSM is used, the output of the inverse quantization module 214 is directly used as the reconstructed residual rather than being processed by the inverse transform module 215.

When BDPCM is enabled for the current block, a BDPCM module 311 perform BDPCM process on the output of the quantization module 211 before entropy encoding, and an inverse BDPCM module 314 performs corresponding BDPCM process at the input of the inverse quantization module 214. The entropy encoder 290 may perform a regular residual coding (RRC) process 311 or a transform skip residual coding (TSRC) process 312 based on whether alternative residual coding is used or not.

A coding control module 300 may control the skipping of transform and inverse transform operations at the transform module 210 and the inverse transform module 215. The coding control module 300 may also enable or disable corresponding BDPCM operations at the BDPCM module 311 and the inverse BDPCM module 314. The coding control module may also enable or disable alternative residual coding by selecting one of TSRC or RRC in the entropy encoder 290.

Depending on whether TSM, BDPCM, and/or alternative residual coding is used for the current sequence of video pictures, the current picture, or the current block, the coding control module 300 may encode corresponding syntax elements such as sps_transform_skip_enable_flag, sps_bdpcm_enable_flag, and/or alternative_residual_coding_flag (for PPS or SPS or slice header) into the bitstream 295.

Figure 4:
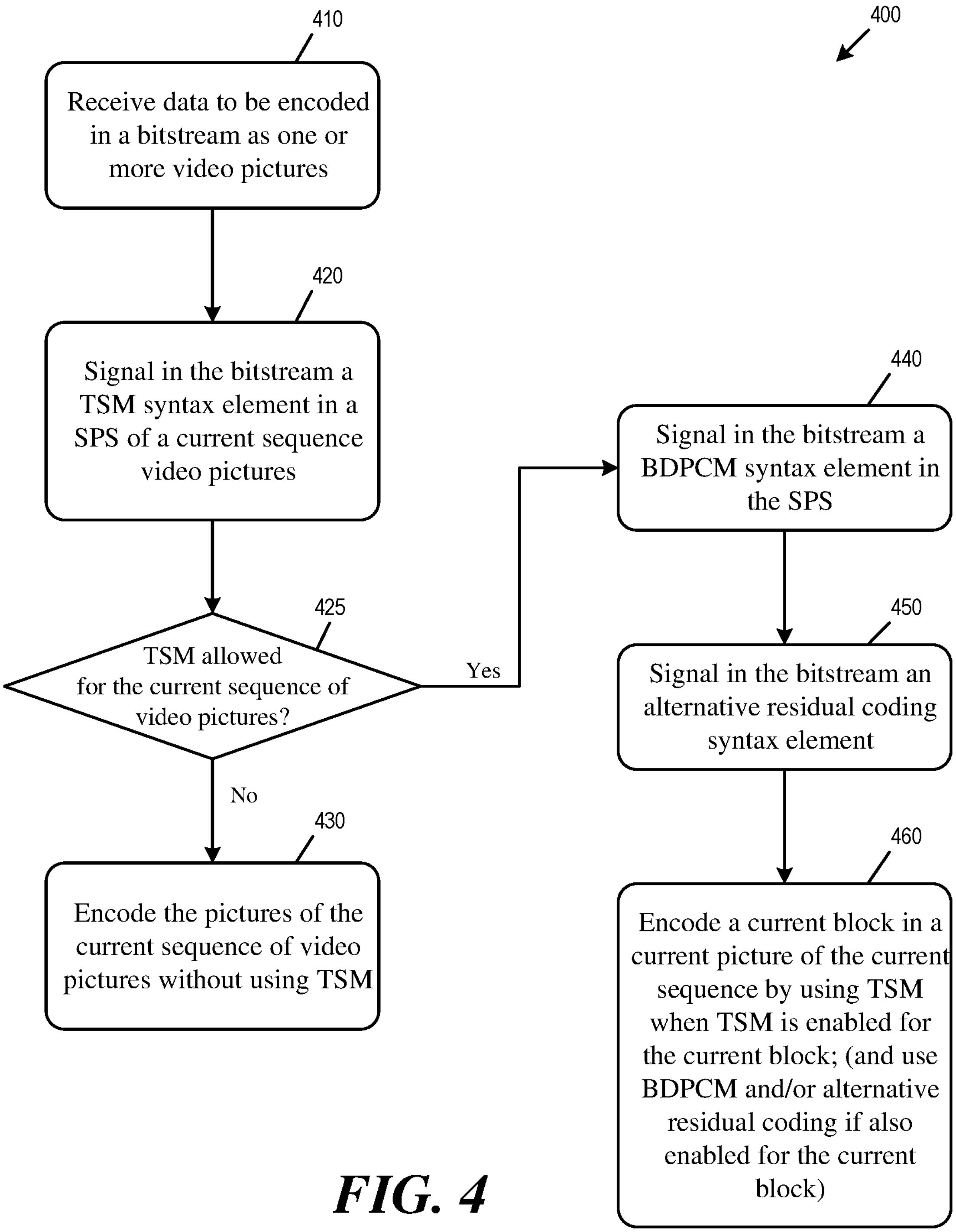
FIG. 4 conceptually illustrates a process for using transform skip mode during video encoding.

FIG. 4 conceptually illustrates a process 400 for using transform skip mode during video encoding. In some embodiments, one or more processing units (e.g., a processor) of a computing device implementing the encoder 200 performs the process 400 by executing instructions stored in a computer readable medium. In some embodiments, an electronic apparatus implementing the encoder 200 performs the process 400.

The encoder receives (at block 410) data to be encoded in a bitstream as one or more video pictures. The encoder signals (at block 420) in the bitstream a TSM syntax element (e.g., sps_transform_skip_enable_flag) in a SPS of a current sequence of video pictures. The encoder determines (at block 425) whether TSM is allowed for the current sequence of video pictures. If TSM is allowed for the current sequence, the process proceeds to 440. If TSM is not allowed for the current sequence, the process proceeds to 430.

At block 430, the encoder encodes the pictures of the current sequence without using TSM. In some embodiments, when the TSM syntax element indicates that the transform skip mode is not enabled for the current sequence of video pictures, all blocks in the current sequence of video pictures are coded by using quantized transformed coefficients.

At block 440, the encoder signals in the bitstream a BDPCM syntax element (e.g., sps_bdpcm_enable_flag) in the SPS to indicate whether BDPCM is allowed for pictures in the current sequence. The encoder also signals (at block 450) in the bitstream an alternative residual coding syntax element (e.g., alternative_residual_coding_flag for PPS or SPS or slice header). The process then proceeds to block 460.

The encoder encodes (at block 460) a current block in a current picture of the current sequence of video pictures by using TSM if TSM is allowed for the sequence of video pictures and if TSM is enabled for the current block. For example, if a flag in the bitstream indicates TSM is active for the current block, the encoder encodes the current block by using quantized residual signals that are not transformed and remain in a spatial domain.

When the current block is coded by using TSM, the encoding of the current block may also use BDPCM and/or alternative residual coding if those modes are enabled for the current block. Specifically, when BDPCM is allowed for the current sequence of video pictures and BDPCM is enabled for the current block (e.g., a flag in the bitstream indicating BDPCM is active for the current block), BDPCM is used to encode the current block (a residual signal of a position in the current block is coded by using a difference between the residual signal and a previously coded residual signal of a neighboring position.) When alternative residual coding is enabled for the current block (e.g., there is no flag in the bitstream disabling alternative residual coding for the current slice), alternative residual coding (e.g., TSRC) is used to entropy encode the residual signals of the current block, otherwise regular residual coding (RRC) is used.

IV. Example Video Decoder

Figure 5:
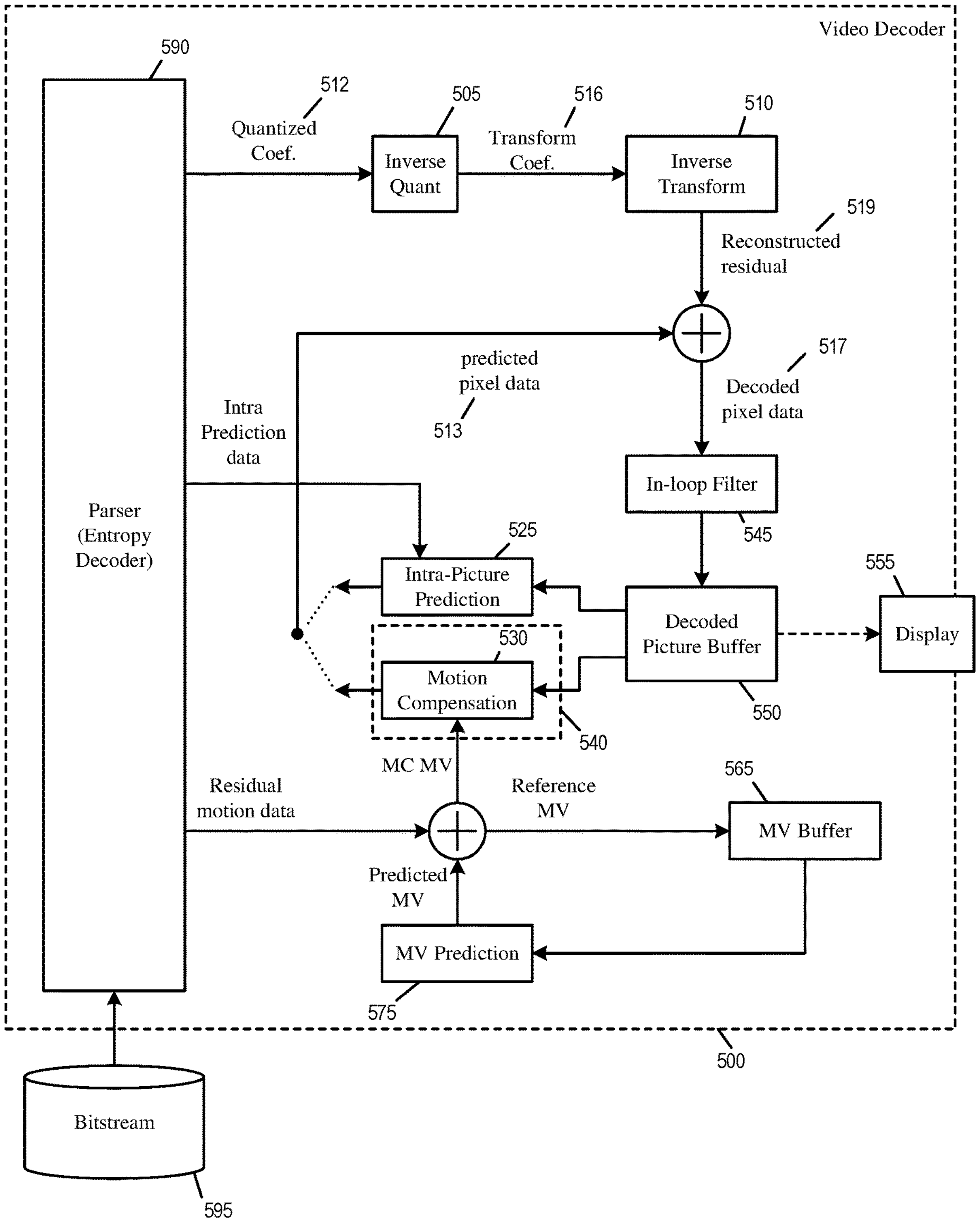
FIG. 5 illustrates an example video decoder that is capable of implementing transform skip mode.

FIG. 5 illustrates an example video decoder 500 that is capable of implementing transform skip mode. As illustrated, the video decoder 500 is an image-decoding or video-decoding circuit that receives a bitstream 595 and decodes the content of the bitstream into pixel data of video frames for display. The video decoder 500 has several components or modules for decoding the bitstream 595, including some components selected from an inverse quantization module 505, an inverse transform module 510, an intra-prediction module 525, a motion compensation module 530, an in-loop filter 545, a decoded picture buffer 550, a MV buffer 565, a MV prediction module 575, and a parser 590. The motion compensation module 530 is part of an inter-prediction module 540.

In some embodiments, the modules 510-590 are modules of software instructions being executed by one or more processing units (e.g., a processor) of a computing device. In some embodiments, the modules 510-590 are modules of hardware circuits implemented by one or more ICs of an electronic apparatus. Though the modules 510-590 are illustrated as being separate modules, some of the modules can be combined into a single module.

The parser 590 (or entropy decoder) receives the bitstream 595 and performs initial parsing according to the syntax defined by a video-coding or image-coding standard. The parsed syntax element includes various header elements, flags, as well as quantized data (or quantized coefficients) 512. The parser 590 parses out the various syntax elements by using entropy-coding techniques such as context-adaptive binary arithmetic coding (CABAC) or Huffman encoding.

The inverse quantization module 505 de-quantizes the quantized data (or quantized coefficients) 512 to obtain transform coefficients, and the inverse transform module 510 performs inverse transform on the transform coefficients 516 to produce reconstructed residual signal 519. The reconstructed residual signal 519 is added with predicted pixel data 513 from the intra-prediction module 525 or the motion compensation module 530 to produce decoded pixel data 517. The decoded pixels data are filtered by the in-loop filter 545 and stored in the decoded picture buffer 550. In some embodiments, the decoded picture buffer 550 is a storage external to the video decoder 500. In some embodiments, the decoded picture buffer 550 is a storage internal to the video decoder 500.

The intra-prediction module 525 receives intra-prediction data from bitstream 595 and according to which, produces the predicted pixel data 513 from the decoded pixel data 517 stored in the decoded picture buffer 550. In some embodiments, the decoded pixel data 517 is also stored in a line buffer (not illustrated) for intra-picture prediction and spatial MV prediction.

In some embodiments, the content of the decoded picture buffer 550 is used for display. A display device 555 either retrieves the content of the decoded picture buffer 550 for display directly, or retrieves the content of the decoded picture buffer to a display buffer. In some embodiments, the display device receives pixel values from the decoded picture buffer 550 through a pixel transport.

The motion compensation module 530 produces predicted pixel data 513 from the decoded pixel data 517 stored in the decoded picture buffer 550 according to motion compensation MVs (MC MVs). These motion compensation MVs are decoded by adding the residual motion data received from the bitstream 595 with predicted MVs received from the MV prediction module 575.

The MV prediction module 575 generates the predicted MVs based on reference MVs that were generated for decoding previous video frames, e.g., the motion compensation MVs that were used to perform motion compensation. The MV prediction module 575 retrieves the reference MVs of previous video frames from the MV buffer 565. The video decoder 500 stores the motion compensation MVs generated for decoding the current video frame in the MV buffer 565 as reference MVs for producing predicted MVs.

The in-loop filter 545 performs filtering or smoothing operations on the decoded pixel data 517 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 6:
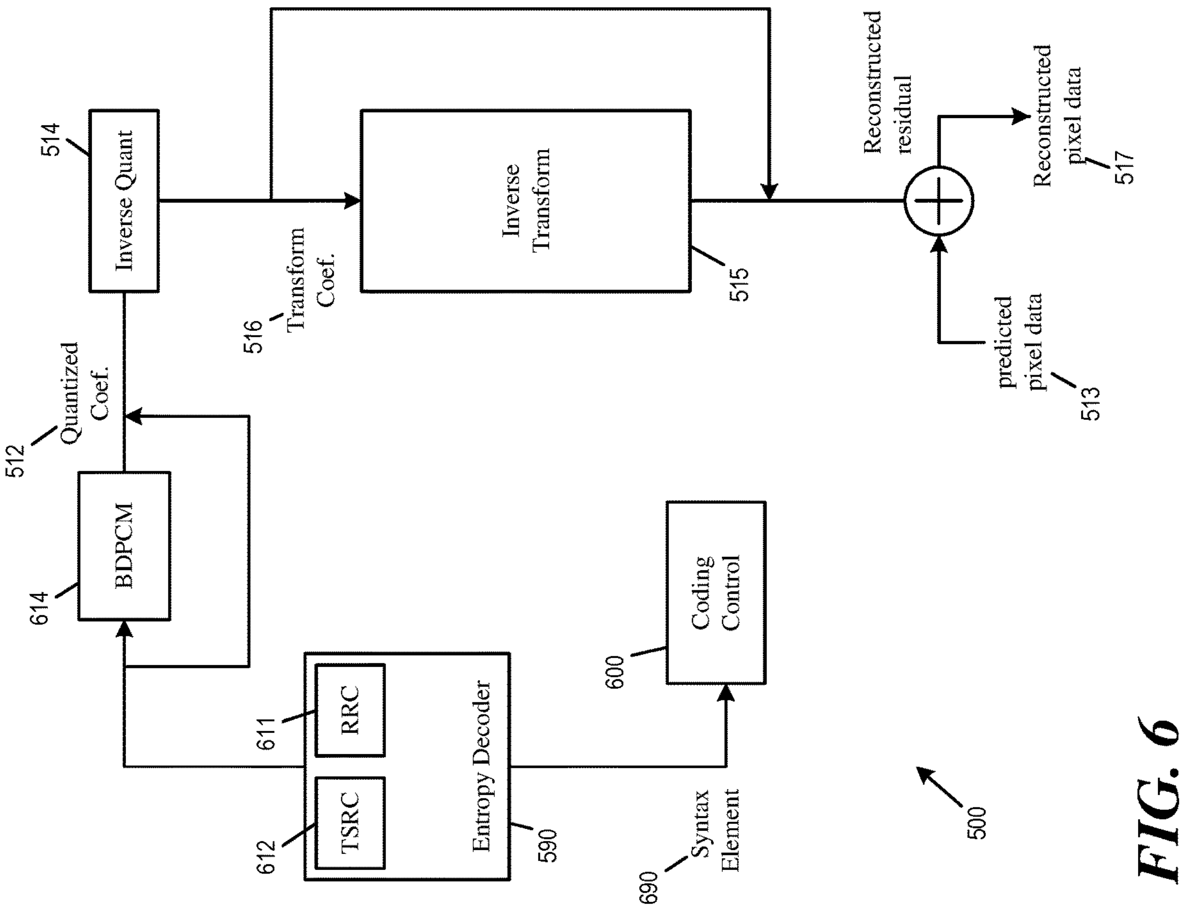
FIG. 6 illustrates portions of the video decoder that implement transform skip mode.

FIG. 6 illustrates portions of the video decoder 500 that implement transform skip mode. Specifically, the decoder 500 determines whether to skip (inverse) transform operations, and whether to use transform skip related operations such as BDPCM and/or alternative residual coding for each block of pixels based on whether those tools are enabled for the current picture or a current sequence that includes the current picture.

As illustrated, the inverse quantizer 514 performs inverse quantization operation on the quantized coefficients 512 that are parsed by the entropy decoder 590. The output of the inverse quantizer 514 is provided to the inverse transform module 516 to be inverse transformed into residual signals. When TSM is used, the output of the inverse quantization module 514 is directly used as the reconstructed residual rather than being processed by the inverse transform module 515.

When BDPCM is enabled for the current block, an inverse BDPCM module 614 performs BDPCM process at the input of the inverse quantization module 514. The entropy decoder 590 may perform a regular residual coding (RRC) process 611 or a transform skip residual coding (TSRC) process 612 based on whether alternative residual coding is used or not.

A coding control module 600 may control the skipping of inverse transform operations at the inverse transform module 515. The coding control module 600 may also enable or disable BDPCM operations at the inverse BDPCM module 614. The coding control module may also enable or disable alternative residual coding by selecting one of TSRC or RRC in the entropy decoder 590. The coding control module 600 may generates the controls for these TSM related operations based on the syntax elements such as sps_transform_skip_enable_flag, sps_bdpcm_enable_flag, and/or alternative_residual_coding_flag (for PPS or SPS or slice header) that are parsed from the bitstream 595 by the entropy decoder 590.

Figure 7:
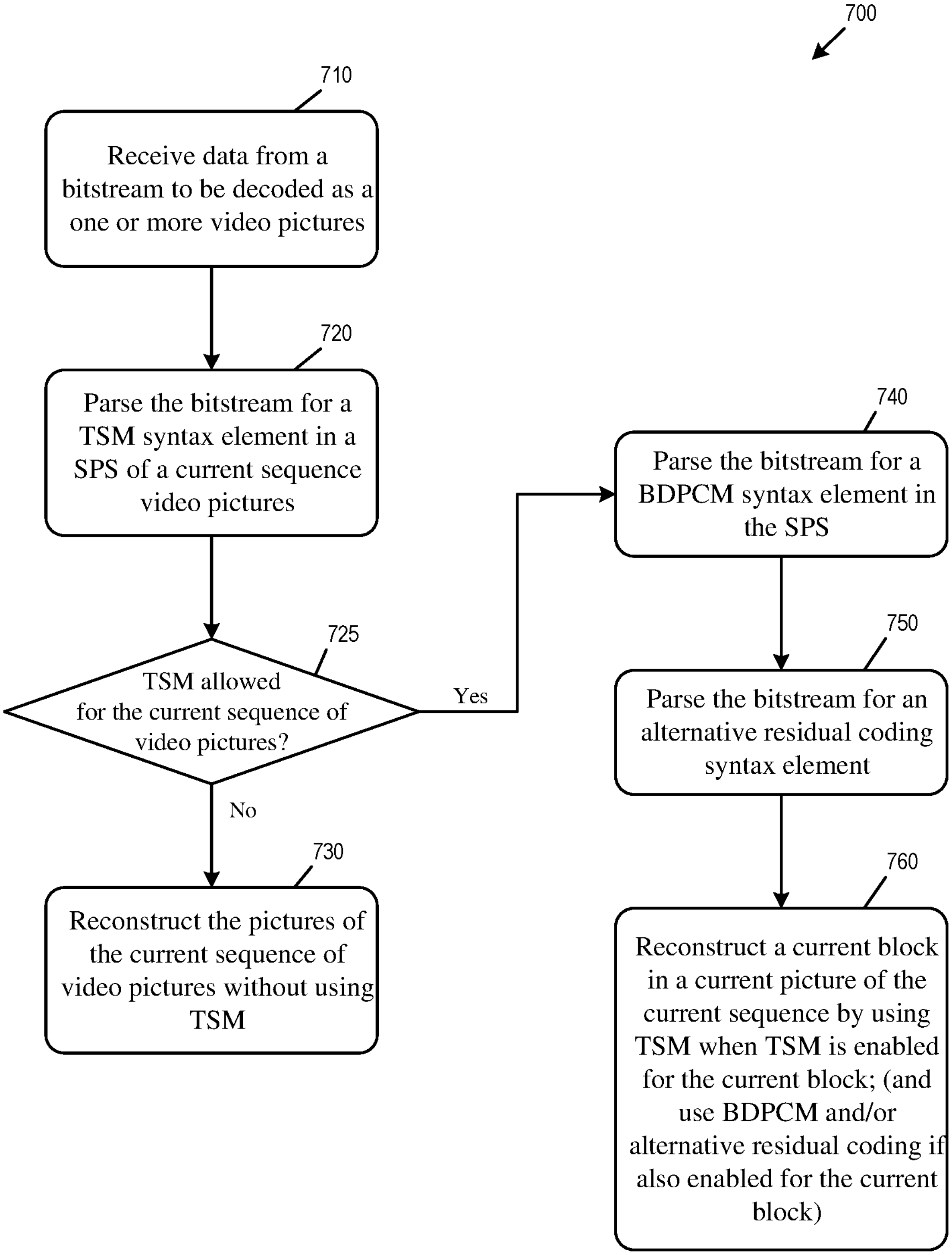
FIG. 7 conceptually illustrates a process for using transform skip mode during video decoding.

FIG. 7 conceptually illustrates a process 700 for using transform skip mode during video encoding. In some embodiments, one or more processing units (e.g., a processor) of a computing device implementing the decoder 500 performs the process 700 by executing instructions stored in a computer readable medium. In some embodiments, an electronic apparatus implementing the decoder 500 performs the process 700.

The decoder receives (at block 710) data from a bitstream to be decoded as one or more video pictures. The decoder parses (at block 720) the bitstream for a TSM syntax element (e.g., sps_transform_skip_enable_flag) in a SPS of a current sequence of video pictures. The decoder determines (at block 725) whether TSM is allowed for the current sequence of video pictures. If TSM is allowed for the current sequence, the process proceeds to 740. If TSM is not allowed for the current sequence, the process proceeds to 730.

At block 730, the decoder reconstructs the pictures of the current sequence without using TSM. In some embodiments, when the TSM syntax element indicates that the transform skip mode is not allowed for the current sequence of video pictures, all blocks in the current sequence of video pictures are coded by using quantized transformed coefficients.

At block 740, the decoder parses the bitstream for a BDPCM syntax element (e.g., sps_bdpcm_enable_flag) in the SPS to indicate whether BDPCM is allowed for pictures in the current sequence. The decoder also parses (at block 750) the bitstream for an alternative residual coding syntax element (e.g., alternative_residual_coding_flag for PPS or SPS or slice header). The process then proceeds to block 760.

The decoder reconstructs (at block 760) a current block in a current picture of the current sequence of video pictures by using TSM if TSM is allowed for the sequence of video pictures and if TSM is enabled for the current block. For example, if a flag in the bitstream indicates TSM is active for the current block, the decoder reconstructs the current block by using quantized residual signals that are not transformed and remain in a spatial domain.

When the current block is coded by using TSM, the decoding of the current block may also use BDPCM and/or alternative residual coding if those modes are enabled for the current block. Specifically, when BDPCM is allowed for the current sequence of video pictures and BDPCM is enabled for the current block (e.g., a flag in the bitstream indicating BDPCM is active for the current block), BDPCM is used to decode the current block (a residual signal of a position in the current block is coded by using a difference between the residual signal and a previously coded residual signal of a neighboring position.) When alternative residual coding is enabled for the current block (e.g., there is no flag in the bitstream disabling alternative residual coding for the current slice), alternative residual coding (e.g., TSRC) is used to entropy decode the residual signals of the current block, otherwise regular residual coding (RRC) is used.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 8:
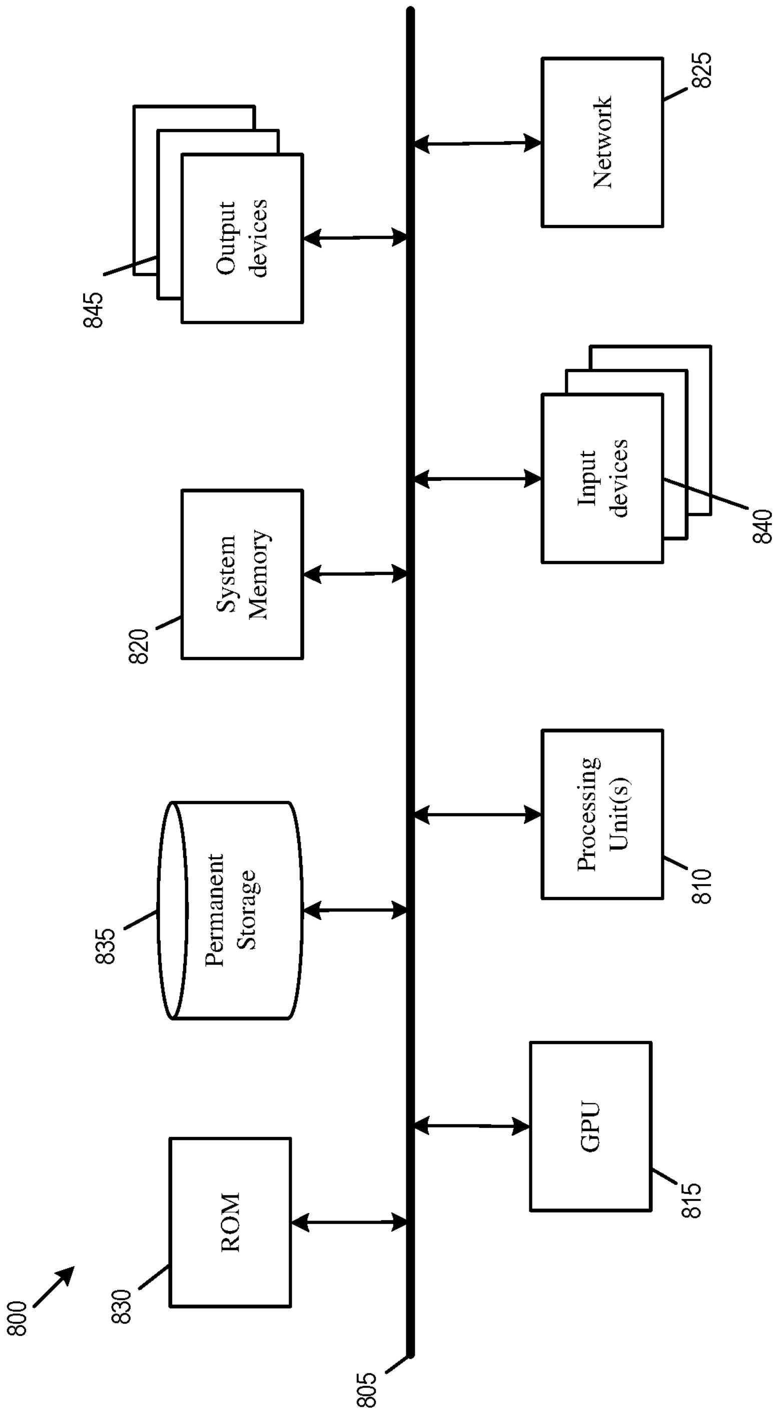
FIG. 8 conceptually illustrates an electronic system with which some embodiments of the present disclosure are implemented.

FIG. 8 conceptually illustrates an electronic system 800 with which some embodiments of the present disclosure are implemented. The electronic system 800 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 800 includes a bus 805, processing unit(s) 810, a graphics-processing unit (GPU) 815, a system memory 820, a network 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the GPU 815, the read-only memory 830, the system memory 820, and the permanent storage device 835.

From these various memory units, the processing unit(s) 810 retrieves instructions to execute and data to process in order to execute the processes of the present disclosure. The processing unit(s) may be a single processor or a multi-core processor in different embodiments. Some instructions are passed to and executed by the GPU 815. The GPU 815 can offload various computations or complement the image processing provided by the processing unit(s) 810.

The read-only-memory (ROM) 830 stores static data and instructions that are used by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the present disclosure use a mass-storage device (such as a magnetic or optical disk and its corresponding disk drive) as the permanent storage device 835.

Other embodiments use a removable storage device (such as a floppy disk, flash memory device, etc., and its corresponding disk drive) as the permanent storage device. Like the permanent storage device 835, the system memory 820 is a read-and-write memory device. However, unlike storage device 835, the system memory 820 is a volatile read-and-write memory, such a random access memory. The system memory 820 stores some of the instructions and data that the processor uses at runtime. In some embodiments, processes in accordance with the present disclosure are stored in the system memory 820, the permanent storage device 835, and/or the read-only memory 830. For example, the various memory units include instructions for processing multimedia clips in accordance with some embodiments. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 4 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:

receiving data from a bitstream to be decoded as a plurality of video pictures;

obtaining a first syntax element from a sequence parameter set (SPS) of a current sequence of video pictures in the bitstream, the first syntax element indicating whether a transform skip mode is allowed for the current sequence of video pictures in which a current block belongs:

in response to the first syntax element indicating that the transform skip mode is allowed for the current sequence of video pictures, obtaining from the SPS one or more other syntax elements, the one or more other syntax elements indicating whether one or more coding tools is enabled for the current sequence; and when the first syntax element indicates that the transform skip mode is allowed for the current sequence of video pictures and the one or more other syntax elements indicates that a particular coding tool of the one or more coding tools is enabled for the current sequence, parsing the bitstream to determine one or more flags indicating whether the particular coding tool is used for coding the current block, and reconstructing the current block by using quantized residual signals that are not transformed and remain in a spatial domain according to the particular coding tool when a result of the parsing, indicates that the particular coding tool is used for coding the current block.

2. The method of claim 1, wherein the one or more other syntax elements include a second syntax element indicating Whether Block Delta Pulse Code Modulation (BDPCM) is enabled for the current sequence of video pictures.

3. The method of claim 2., wherein when the BDPCM is enabled. for the current sequence of video pictures, a flag associated with the current block of the current picture is coded in the bitstream to indicate whether the current block is coded by using the BDPCM.

4. The method of claim 3, wherein a residual signal of a position in the current block is coded by using a difference between the residual signal and a previously coded residual signal of a neighboring position.

5. The method of claim 2 claim 1, wherein the one or more other syntax elements include a third syntax element for indicating whether an alternative residual coding process is enabled for entropy coding residual signals of the current block.

6. The method of claim 1, wherein when the first syntax element indicates that the transform skip mode is allowed for the current sequence of video pictures, parsing the bitstream for a flag for indicating whether an alternative residual coding process is enabled for en trop coding the residual signals of the current block.

7. The method of claim 1, wherein when the first syntax element indicates that the transform skip mode is allowed for the current sequence of video pictures, a first flag is parsed from the bitstream to indicate whether the current block of the current picture is coded by using transform skip mode.

8. The method of claim 7, wherein when the current block is coded by using the transform skip mode and when an alternative residual coding process is enabled, the residual signals of the current block is entropy coded by using transform skip residual coding.

9. The method of claim 1, wherein when the first syntax element indicates that the transform skip mode is not enabled for the current sequence of video pictures, all blocks in the current sequence of video pictures are coded by using quantized transformed coefficients.

10. The method of claim 1. wherein the one or more other syntax elements include:

a second syntax element indicating whether Block Delta Pulse Code Modulation (BDPCM) is enabled for the current sequence; or a third syntax element for indicating whether an alternative residual coding process is enabled for entropy coding residual signals of the current block.

11. An electronic apparatus, comprising:

a video decoder circuit configured to perform operations comprising:

receiving data from a bitstream to be decoded as a plurality of video pictures;

obtaining a first syntax element in from a sequence parameter set (SPS) of a current sequence of video pictures in the bitstream. the first syntax element indicating whether a transform skip mode is allowed for the current sequence of video pictures in which a current block belongs;

in response to the first syntax element indicating that the transform skip mode is allowed for the current sequence of video pictures, obtaining from the SPS one or more other syntax elements, the one or more other syntax elements indicating whether one or more coding tools is enabled for the current sequence; and when the first syntax element indicates that the transform skip mode is allowed for the current sequence of video pictures and the one or more other syntax elements indicates that a particular coding tool of the one or more coding tools is enabled for the current sequence, parsing the bitstream to determine one or more flags indicating whether the particular coding tool is used for coding the current block, and reconstructing the current block by using quantized residual signals that are not transformed and remain in a spatial domain according to the particular coding tool when a result of the parsing indicates that the particular coding tool is used for coding the current block.

12. The electronic apparatus of claim 11, wherein the one or more other syntax elements include:

a second syntax element indicating whether Block Delta .Pulse Code Modulation (BDPCM) is enabled for the current sequence; or a third syntax element for indicating whether an alternative residual coding process is enabled for entropy coding residual signals of the current block.

13. A video encoding method, comprising:

receiving data of a plurality of video pictures to be encoded and included in a bitstream:

signaling in the bitstream a first syntax element in a sequence parameter set (SPS) of a current sequence of video pictures, the first syntax element indicating whether a transform skip mode is allowed for the current sequence of video pictures in which a current block belongs;

in response to the first syntax element indicating that the transform skip mode is allowed for the current sequence of video pictures, including in the SPS one or more other syntax elements, the one or more other syntax elements indicating whether one or more coding tools is enabled for the current sequence; and when the first syntax element indicates that the transform skip mode is allowed for the current sequence of video pictures and the one or more other syntax elements indicates that a particular coding tool of the one or more coding tools is enabled for the current sequence, configuring the bitstream to specify one or more flags indicating whether the particular coding tool is used for coding the current block, and encoding the current block by quantizing residual signals that are not transformed and remain in a spatial domain according to the particular coding tool when the one or more flags indicate that the particular coding tool is used for coding the current block.

14. The method of claim 13, Wherein the one or more other syntax elements include:

a second syntax element indicating Whether Block Delta Pulse Code Modulation (BDPCM) is enabled for the current sequence; or a third syntax element for indicating Whether an alternative residual coding process is enabled for entropy coding residual signals of the current block.

* * * * *